United States Patent
Takahashi

(10) Patent No.: US 10,137,895 B2
(45) Date of Patent: Nov. 27, 2018

(54) VEHICLE CONTROL APPARATUS

(71) Applicant: Fuji Jukogyo Kabushiki Kaisha, Tokyo (JP)

(72) Inventor: Yoshitaka Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 84 days.

(21) Appl. No.: 15/336,577

(22) Filed: Oct. 27, 2016

(65) Prior Publication Data
US 2017/0158198 A1 Jun. 8, 2017

(30) Foreign Application Priority Data
Dec. 4, 2015 (JP) .................................. 2015-237852

(51) Int. Cl.
*F16H 59/20* (2006.01)
*F16H 61/14* (2006.01)
(Continued)

(52) U.S. Cl.
CPC .......... *B60W 30/18* (2013.01); *B60W 10/026* (2013.01); *B60W 10/107* (2013.01);
(Continued)

(58) Field of Classification Search
CPC .......... B60W 30/19; B60W 2710/024; B60W 10/026; B60W 2540/103; F16H 61/02;
(Continued)

(56) References Cited

U.S. PATENT DOCUMENTS

| 2003/0104903 A1* | 6/2003 | Kurabayashi | ........... F16H 59/20 477/48 |
| 2008/0255737 A1* | 10/2008 | Fujiwara | ........... F16H 61/66259 701/51 |

(Continued)

FOREIGN PATENT DOCUMENTS

| JP | H06-307518 A | 11/1994 |
| JP | H 07-024351 A | 1/1995 |

(Continued)

OTHER PUBLICATIONS

JPO Decision to Grant a Patent dated Aug. 8, 2017 in Japanese Application No. 2015-237852.

*Primary Examiner* — Jacob S. Scott
*Assistant Examiner* — Lillian T Nguyen
(74) *Attorney, Agent, or Firm* — McGinn I.P. Law Group, PLLC

(57) ABSTRACT

A vehicle control apparatus for a vehicle including an automatic transmission having a torque converter provided with a lock-up clutch, and including a kick-down controller that performs kick-down control to change a transmission ratio to a low side and to increase a number of engine revolutions based on a kick-down request in accordance with an accelerator operation and a lock-up controller that performs lock-up disengagement control based on the kick-down request to set the lock-up clutch to a disengaged state according to meeting of a disengagement condition. When the kick-down request not during the kick-down control is called a normal kick-down request and the kick-down request during the kick-down control is called a second-time kick-down request, the lock-up controller performs lock-up disengagement control according to the second-time kick-down request based on the disengagement condition which (Continued)

is more eased than the disengagement condition used for the normal kick-down request.

20 Claims, 5 Drawing Sheets

(51) Int. Cl.
  *B60W 30/18* (2012.01)
  *B60W 10/02* (2006.01)
  *B60W 10/107* (2012.01)
  *F16H 59/18* (2006.01)

(52) U.S. Cl.
  CPC ..... *F16H 61/143* (2013.01); *B60W 2540/103* (2013.01); *B60W 2550/142* (2013.01); *B60W 2710/024* (2013.01); *B60W 2710/1005* (2013.01); *F16H 59/18* (2013.01); *F16H 59/20* (2013.01); *F16H 2061/146* (2013.01)

(58) Field of Classification Search
  CPC ............... F16H 61/6629; F16H 59/20; F16H 2061/146; F16H 59/18; F16H 61/143
  See application file for complete search history.

(56) References Cited

U.S. PATENT DOCUMENTS

| | | | |
|---|---|---|---|
| 2009/0240406 A1* | 9/2009 | Fukushima | B60W 10/06 701/54 |
| 2011/0130933 A1* | 6/2011 | Muto | F16H 59/20 701/58 |
| 2015/0152962 A1 | 6/2015 | Ajimoto | |
| 2015/0183437 A1* | 7/2015 | Minamisawa | B60W 10/04 701/54 |
| 2016/0223081 A1* | 8/2016 | Inoue | F16H 37/021 |

FOREIGN PATENT DOCUMENTS

| | | | |
|---|---|---|---|
| JP | 2010209942 A | * | 9/2010 |
| JP | 5169920 B | | 3/2013 |
| JP | 2014-231894 A | | 12/2014 |
| JP | 2015-105748 A | | 6/2015 |

\* cited by examiner

VEHICLE CONTROL APPARATUS

CROSS-REFERENCE TO RELATED APPLICATIONS

The present application claims priority from Japanese Patent Application No. 2015-237852 filed on Dec. 4, 2015, the entire contents of which are hereby incorporated by reference.

BACKGROUND

1. Technical Field

The present disclosure relates to a vehicle control apparatus for a vehicle including an automatic transmission having a torque converter provided with a lock-up clutch.

2. Related Art

Some of vehicles including an automatic transmission having a torque converter provided with a lock-up clutch perform so-called kick-down control in response to strong depression of the accelerator pedal by a driver. The kick-down control changes the transmission gear ratio to a lower rate (down-shift) to increase the torque in response to change of an accelerator opening or an accelerator opening rate to a predetermined value or greater. Also, at the time of kick-down, lock-up disengagement (engagement of the lock-up clutch is disengaged) along with the down-shift is performed, thereby producing a torque amplification effect by the torque converter to achieve further increase of the torque (see, for instance, Japanese Unexamined Patent Application Publication Nos. 2014-231894 and 7-243517, and Japanese Patent No. 5169920).

Although the kick-down control is completed in response to return of the accelerator pedal to the original position, when a driver feels that sufficient acceleration is not obtained by the kick-down control or when further acceleration is needed during acceleration by kick-down (for instance, passing or merging with traffic), the driver may request kick-down for the second time by further depressing the accelerator pedal. Hereinafter a kick-down request made for the second time during the kick-down control is referred to as a "second-time kick-down request". It is presumed that a driver making a second-time kick-down request feels sufficient acceleration feeling is not obtained through the last kick-down request or wants to obtain acceleration feeling again supposed to be achieved by kick-down. However, in order to avoid louder engine noise due to entering of the number of engine revolutions into a high-rotational region and to avoid up-shift immediately after down-shift, the down-shift amount at the time of a second-time kick-down request is preferably set to be small. For this reason, the following setting is hardly made: the amount of down-shift is increased and sufficient acceleration feeling is obtained by increase in driving force or the number of engine revolutions. Therefore, sufficient acceleration feeling is not obtained through a second-time kick-down request and the driver may feel sense of considerable incongruity.

SUMMARY OF THE INVENTION

Thus, it is desirable to overcome the above-mentioned problem, to achieve lock-up control appropriately reflecting the intention of a driver at the time of kick-down and to reduce sense of incongruity of the driver.

An aspect of the present invention provides a vehicle control apparatus including an automatic transmission having a torque converter provided with a lock-up clutch, the vehicle control apparatus including: a kick-down controller that performs kick-down control to change a transmission gear ratio to a low side and to increase a number of engine revolutions based on a kick-down request in accordance with an accelerator operation; and a lock-up controller that performs lock-up disengagement control based on the kick-down request to set the lock-up clutch to a disengaged state according to meeting of a disengagement condition. When the kick-down request while the kick-down control is not in operation is referred to as a normal kick-down request and the kick-down request while the kick-down control is in operation is referred to as a second-time kick-down request, the lock-up controller performs lock-up disengagement control according to the second-time kick-down request based on the disengagement condition which is more eased than the disengagement condition used for the normal kick-down request.

The lock-up controller may perform the lock-up disengagement control according to the normal and second-time kick-down requests based on the disengagement condition including an accelerator operation condition and a down-shift amount condition, the accelerator operation condition being defined as a magnitude relationship between a first threshold value and an index value indicating an operational state of an accelerator at a time of kick-down request, the down-shift amount condition being defined as a magnitude relationship between a second threshold value and an index value correlated with a target down-shift amount which is determined according to an accelerator opening at the time of kick-down request.

The lock-up controller may ease the disengagement condition by changing values for the normal kick-down request and the second-time kick-down request, the values being used as the first threshold value and the second threshold value.

The vehicle control apparatus may include a gradient detector that detects a gradient of a road on which the vehicle runs. According to the gradient, the lock-up controller may set a variable degree of ease of the disengagement condition used for the second-time kick-down request with respect to the disengagement condition used for the normal kick-down request.

The lock-up controller may perform pressure reduction control to reduce a lock-up pressure of the lock-up clutch according to meeting of a pressure reduction condition in each of a preceding stage of the normal kick-down request and a preceding stage of the second-time kick-down request.

The lock-up controller may perform the pressure reduction control in the preceding stage of the second-time kick-down request based on the pressure reduction condition which is more eased than the pressure reduction condition used for the pressure reduction control in the preceding stage of the normal kick-down request.

DETAILED DESCRIPTION

<1. Schematic Configuration of Vehicle Control System>

Figure 1:
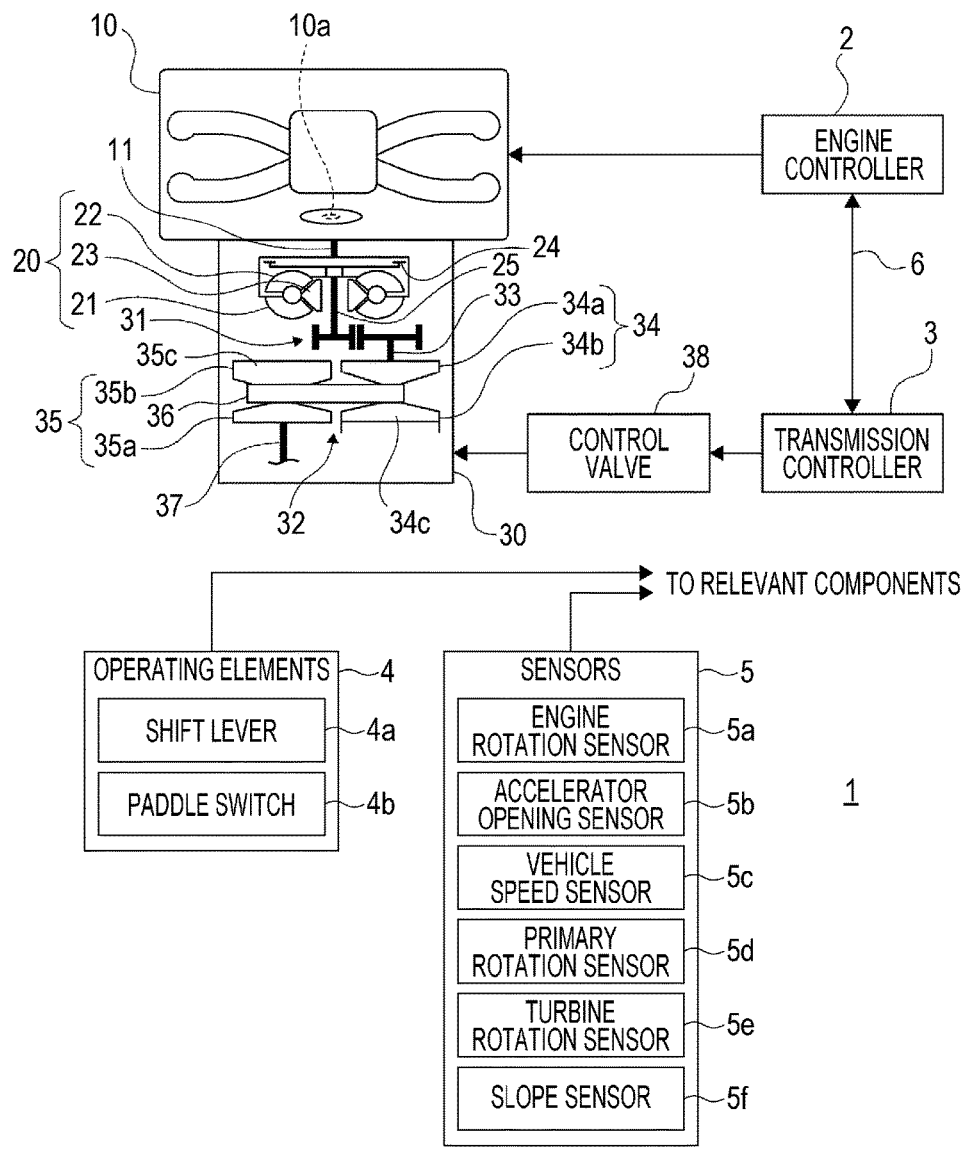
FIG. 1 is a diagram illustrating a schematic configuration of a vehicle control system including a vehicle control apparatus in an implementation according to the present invention.

FIG. 1 is a diagram illustrating the schematic configuration of a vehicle 1 including a vehicle control apparatus as an implementation according to the present invention. It is to be noted that FIG. 1 illustrates only the configuration of substantially major components according to the present invention, extracted out of the configuration of the vehicle 1. The vehicle 1 in the present implementation includes an engine 10, an automatic transmission 30, and a control valve 38 of the automatic transmission 30 as well as an engine controller 2, a transmission controller 3, operating elements 4, sensors 5, and a bus 6.

The engine 10 is, for instance, a horizontally opposed four-cylinder gasoline engine. In the present invention, as the engine 10, a V-type gasoline engine or alternatively another type such as a diesel engine instead of a gasoline engine may be adopted.

The engine 10 has a crankshaft 10a and an output axis 11. Rotation of the crankshaft 10a is transmitted to the output axis 11.

The subsequent stage of the engine 10 is provided with the automatic transmission 30 including a torque converter 20 that has a clutch function and a torque amplification function. In the present example, the automatic transmission 30 is configured as a continuously variable transmission (CVT). Although a chain-type CVT is adopted in the present example, another type of CVT such as a belt-type CVT may be adopted. Also in the present invention, the automatic transmission 30 may be a stepped transmission.

In the automatic transmission 30, the torque converter 20 mainly includes a pump impeller 21, a turbine runner 22, and a stator 23. The pump impeller 21 coupled to the output axis 11 produces a flow of oil, and the turbine runner 22 disposed to be opposed to the pump impeller 21 receives the power of the engine 10 via the oil and drives the output axis. The stator 23 positioned between the pump impeller 21 and the turbine runner 22 rectifies a discharge flow (return) from the turbine runner 22 and returns the flow to the pump impeller 21, thereby generating a torque amplification effect.

In addition, the torque converter 20 has a lock-up clutch 24 that sets an input and an output to a directly connected state. The lock-up clutch 24 is formed as a clutch that allows the pump impeller 21 and the turbine runner 22 to be connected.

When the connection is made by the lock-up clutch 24, the pump impeller 21 and the turbine runner 22 rotate integrally, and the output from the engine 10 is transmitted to the mechanism (the later-described reduction gear 31 and CVT mechanism 33) in the subsequent stage of the turbine runner 22.

It is to be noted that in the present description, a state which is achieved by operating the lock-up clutch 24 (maximizing a lock-up pressure) and in which an input-side rotating member (the pump impeller 21) and an output-side rotating member (the turbine runner 22) in the torque converter 20 rotate integrally at the same rotational speed is referred to as an "engaged state" or a "lock-up state". On the other hand, a state in which the lock-up clutch 24 is not operated and connection between the input-side rotating member and the output-side rotating member in the torque converter 20 is completely closed is referred to as a "disengaged state".

When the lock-up clutch 24 is in a disengaged state, the torque converter 20 amplifies the torque of the driving force of the engine 10, and transmits the driving force to a reduction gear 31 via the output axis 25 of the torque converter 20. On the other hand, when the lock-up clutch 24 is in an engaged state, the torque converter 20 directly transmits the driving force of the engine 10 to the reduction gear 31 via the output axis 25.

The CVT mechanism 33 has a primary axis 33, a primary pulley 34, a secondary pulley 35, a chain 36, and a secondary axis 37.

The primary axis 33 is coupled to the output axis 25 of the torque converter 20 via the reduction gear 31. The secondary axis 37 is disposed in parallel with the primary axis 33.

The primary pulley 34 has a fixed pulley 34a bonded to the primary axis 33, and a movable pulley 34b which faces the fixed pulley 34a and which is mounted slidably in the axial direction of the primary axis 33. The primary pulley 34 is configured to allow the space between the cone surfaces of the pulleys 34a, 34b, that is, the pulley groove width to be changed. On the other hand, the secondary pulley 35 has a fixed pulley 35a bonded to the secondary axis 37, and a movable pulley 35b which faces the fixed pulley 35a and which is mounted slidably in the axial direction of the secondary axis 37. The secondary pulley 35 is configured to allow its pulley groove width to be changed.

The chain 36, which transmits a driving force, is stretched between the primary pulley 34 and the secondary pulley 35. The groove widths of the primary pulley 34 and the secondary pulley 35 are changed so that the ratio (pulley ratio) of a winding diameter of the chain 36 with respect to each pulley 34, 35 is changed, thereby continuously varying the transmission gear ratio. Here, the transmission gear ratio i is expressed by "i=Rs/Rp", where Rp is the winding diameter of the chain 36 to the primary pulley 34 and Rs is the winding diameter of the chain 36 to the secondary pulley 35.

Here, a hydraulic pressure chamber 34c is formed in the primary pulley 34 (the movable pulley 34b), and a hydraulic pressure chamber 35c is formed in the secondary pulley 35 (the movable pulley 35b). The groove width of each of the primary pulley 34 and the secondary pulley 35 is controlled by adjusting a primary hydraulic pressure introduced into the hydraulic pressure chamber 34c of the primary pulley 34 and a secondary hydraulic pressure introduced into the hydraulic pressure chamber 35c of the secondary pulley 35.

The hydraulic pressure for shifting the automatic transmission 30, that is, the above-mentioned primary hydraulic pressure and secondary hydraulic pressure is controlled by a control valve 38. Although illustration is omitted, the control valve 38 opens and closes an oil passage formed in a valve body using a spool valve and a solenoid valve (electromagnetic valve) that causes the spool valve to move, thereby adjusting the hydraulic pressure discharged from an oil pump and supplying the hydraulic pressure to the hydraulic pressure chamber 34c of the primary pulley 34 and the hydraulic pressure chamber 35c of the secondary pulley 35.

In addition, the control valve 38 performs hydraulic pressure control for lock-up pressure control of the lock-up clutch 24.

It is to be noted that the power transmitted to the secondary pulley 35 is finally transmitted to a driving wheel via a predetermined mechanism in the subsequent stage of the automatic transmission 30.

The operating elements 4 collectively indicate various operating elements provided in the vehicle. An operating element belonging to the operating elements 4 is, for instance, a shift lever 4a or a paddle switch 4b. The shift lever 4a is an operating element which is provided in the floor (center console) or the like of a vehicle, and which allows an operation by a driver to switch alternatively between an automatic transmission mode ("D" range) and a manual transmission mode ("M" range). In the shift lever 4a, a range switch is mounted which is coupled so as to move in conjunction with the shift lever 4a and which detects a selected position of the shift lever 4a. The selected position of the detected shift lever 4a is read into the transmission controller 3 by the range switch. It is to be noted that the shift lever 4a allows selective switching between parking "P" range, reverse "R" range, neutral "N" range in addition to the "D" range, "M" range.

The paddle switch 4b is an operating element which is provided in a steering wheel 53, and which allows a transmission operation (transmission request) by a driver. The paddle switch 4b allows a driver to request (up-shift request) to shift the transmission gear ratio to a higher ratio and to request (down-shift request) to shift the transmission gear ratio to a low side.

An operation input signal for each operation element obtained via the operating elements 4 is supplied to the relevant components of the engine controller 2 and the transmission controller 3.

The sensors 5 collectively indicate various types of sensors provided in the vehicle. Particularly in the present implementation, the sensors 5 include an engine rotation sensor 5a that detects the number of engine revolutions from change of the rotational position of the crankshaft 10a, an accelerator opening sensor 5b that detects an accelerator opening indicating an amount of depression of the accelerator pedal, a vehicle speed sensor 5c that detects a vehicle speed which is a running speed of the vehicle 1, a primary rotation sensor 5d that detects a number of revolutions of the primary pulley 34, a turbine rotation sensor 5e that detects a number of revolutions of the turbine runner 22, and a gradient sensor 5f that detects the gradient of a road on which the vehicle runs.

A signal detected by each sensor is supplied to the relevant components of the engine controller 2 and the transmission controller 3.

The engine controller 2 and the transmission controller 3 are each comprised of a microcomputer including, for instance, a central processing unit (CPU), a read only memory (ROM), and a random access memory (RAM), which are coupled to each other to allow data communication therebetween via a bus 6 compatible to a predetermined on-vehicle network communication standard such as a controller area network (CAN).

The engine controller 2 performs control of various operations such as fuel injection control, ignition control, suction air amount adjustment control. Specifically, various actuators (for instance, a throttle actuator that drives a throttle valve and an injector that performs fuel injection) provided in the engine 10 are controlled, thereby controlling various operations of the engine 10. The engine controller 2 communicates with the transmission controller 3, and outputs data on the operating state of the engine 10 to the transmission controller 3 as necessary. In addition, the engine controller 2 controls the operation of the engine 10 as necessary based on various signals from the transmission controller 3.

The transmission controller 3 controls the drive of the solenoid valve (electromagnetic valve) included in the above-described control valve 38, thereby controlling the operation of the automatic transmission 30. Specifically, the transmission controller 3 adjusts the hydraulic pressure supplied to the hydraulic pressure chamber 34c of the primary pulley 34 and the hydraulic pressure chamber 35c of the secondary pulley 35, and changes the transmission gear ratio of the automatic transmission 30. In addition, the transmission controller 3 adjusts the hydraulic pressure for lock-up pressure control of the lock-up clutch 24, and performs control such as engagement/disengagement of the lock-up clutch 24.

Also, when the automatic transmission mode is selected, the transmission controller 3 changes the transmission gear ratio continuously according to an operating state (for instance, an accelerator opening and a vehicle speed) of the vehicle based on a transmission map. It is to be noted that a transmission map corresponding to the automatic transmission mode is stored in a ROM provided in the transmission controller 3. On the other hand, when the manual transmission mode is selected, the transmission gear ratio is controlled based on a transmission operation received by the paddle switch 4b.

Furthermore, when a kick-down request based on an accelerator operation is made by a driver, the transmission controller 3 changes the transmission gear ratio of the automatic transmission 30 to the low side, and performs kick-down control to increase the number of engine revolutions. Also, the transmission controller 3 controls the lock-up pressure of the lock-up clutch 24 in response to the time of kick-down (the details will be described later).

<2. Kick-Down Control>

The kick-down control performed by the transmission controller 3 will be described with reference to FIG. 2. It is to be noted that hereinafter "kick-down" may be abbreviated as "KD".

First, in KD control, it is determined whether or not a KD request from a driver has been made based on an accelerator operation (KD determination processing). The KD determination processing is performed by determining, for instance, whether or not an accelerator opening or an accelerator opening rate (an increase rate of the accelerator opening) has become a predetermined value or greater.

Here, a KD request by a driver may be made even when KD control is in execution (for instance, in the case where the driver determines that sufficient acceleration feeling is not obtained by the started KD control). For this reason, in the present implementation, KD determination processing is performed even when KD control is in execution. Hereinafter, KD determination processing performed when kick-down control is not in execution, in other words, KD determination processing performed as determination of whether or not kick-down control is to be started is referred to as "normal KD determination processing", and KD determination performed during KD control is referred to as "second-time KD determination processing".

In the present example, the normal KD determination processing and the second-time KD determination processing are performed in consideration of a vehicle speed and a gradient. Specifically, a map for KD determination defining the above-mentioned predetermined values according to a vehicle speed and a gradient is stored, and the predetermined values are obtained based on the map for KD determination, and it is determined whether or not an accelerator opening and an accelerator opening rate are the respective predetermined values or greater.

It is to be noted that the second-time KD determination processing may be performed based on an increased amount of the accelerator opening during the KD control. For instance, it is possible to adopt a technique of determining whether or not an increased amount in accelerator opening reaches a predetermined increase amount or greater, the increased amount relative to the accelerator opening at the start of the later-described second KD step in the normal KD control.

Hereinafter, a KD request of a driver determined by the normal KD determination processing is referred to as a "normal KD request", and a KD request of a driver determined by the second-time KD determination processing is referred to as a "second-time KD request".

When it is determined that a normal KD request has been made, the transmission controller 3 starts the KD control. The KD control in the present example is the control by two steps: a first KD step started in response to a normal KD request and a second KD step performed subsequently to the first KD step.

The KD control including the first KD step and the second KD step in the present example will be described with reference to FIG. 2. It is to be noted that in FIG. 2, the lower graph illustrates an instance of an accelerator operation (change in accelerator opening on the time-axis) including a normal KD request and a second-time KD request made by a driver, and the upper graph illustrates the change on the time-axis in a target PRI revolutions (short dashed line), a target PRI revolutions upper limit (long dashed line), and an actual PRI revolutions (solid line) which are set in the KD control of the present example to the accelerator operation illustrated in the lower graph.

It is to be noted that the "PRI revolutions" is an abbreviation of the number of revolutions of the primary pulley 34.

First, the KD control in the present example includes normal KD control performed in response to a normal KD request and second-time KD control performed in response to a second-time KD request. Furthermore, the control performed as these normal KD control and second-time KD control includes the control as the first KD step and the control as the second KD step.

In the first KD step and the second KD step in each of the normal KD control and the second-time KD control, the target PRI revolutions upper limit, the target PRI revolutions are calculated, and the number of revolutions (the actual PRI revolutions) of the primary pulley 34 is controlled based on the target PRI revolutions. Specifically, the control valve 38 is controlled so that the actual PRI revolutions converges to the target PRI revolutions.

The details of the first KD step and the second KD step in each of the normal KD control and the second-time KD control are as follows.

[1] The First KD Step in the Normal KD Control
The first KD step is started in response to a normal KD request.
The target PRI revolutions upper limit: a value based on an accelerator opening and a vehicle speed is obtained (a map for the first KD step is used). A value according to an accelerator opening and a vehicle speed is obtained as the target PRI revolutions upper limit at each time of predetermined periods. The map of target PRI revolutions upper limit in the first KD step is made such that an appropriate down-shift amount is provided when acceleration according to an accelerator opening is made at each vehicle speed.

The target PRI revolutions: a value determined by imposing restriction of amount of change for the first KD step on the target PRI revolutions upper limit. The value is calculated each time the target PRI revolutions upper limit is newly obtained. Specifically, the target PRI revolutions is calculated so as to follow the target PRI revolutions upper limit in a range in which the amount of change (increase rate) of the target PRI revolutions from the last calculation timing to the current calculation timing of the target PRI revolutions does not exceed a predetermined amount of change. In this step, as the above-mentioned "predetermined amount of change", a value determined by, for instance, an accelerator opening and a vehicle speed is obtained each time from a corresponding map.

Figure 2:
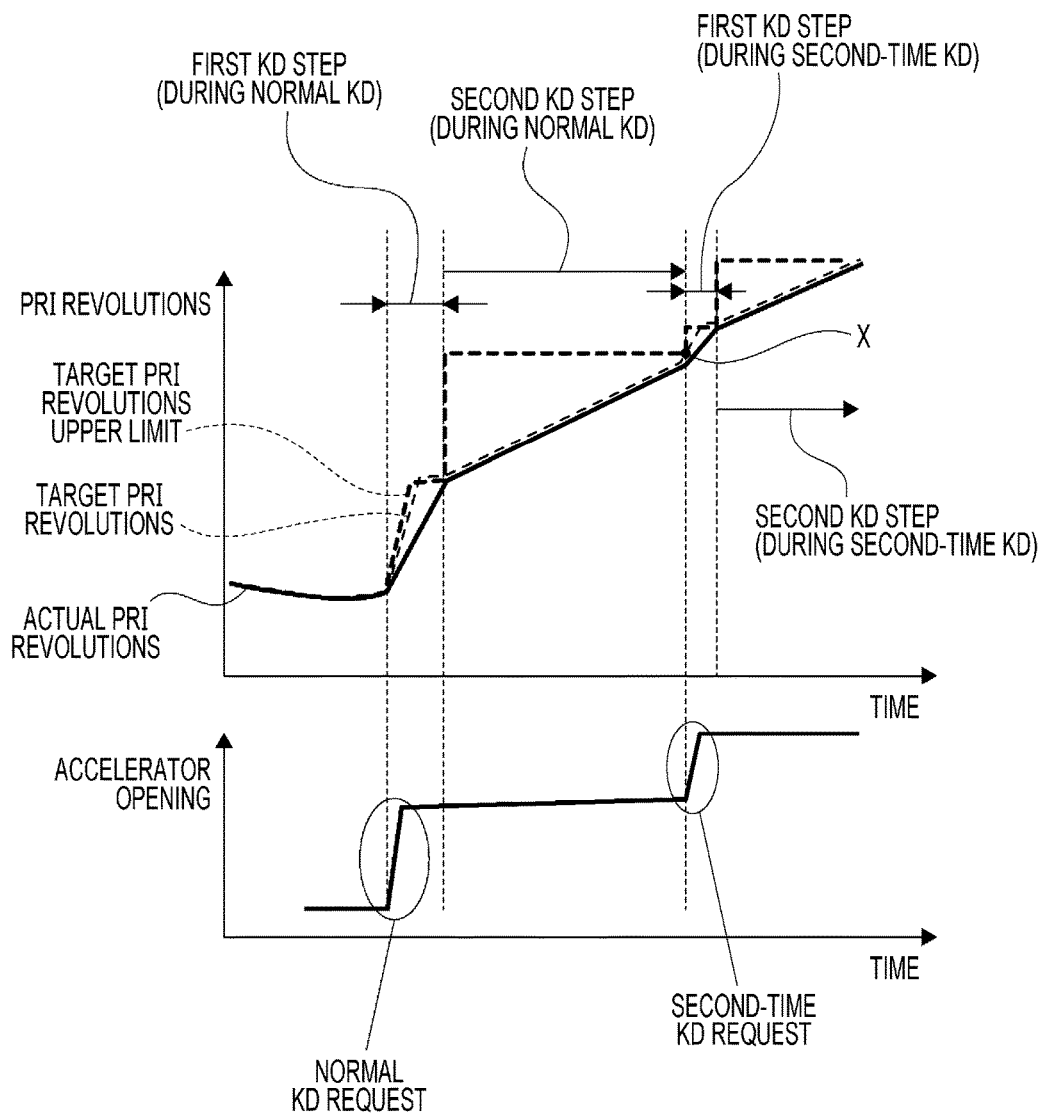
FIG. 2 is an explanatory diagram of kick-down control in the implementation.

In FIG. 2, when the target PRI revolutions upper limit and the target PRI revolutions in "the first KD step (at the time of normal KD)" are compared to each other, in the first KD step at the time of normal KD control, the target PRI revolutions upper limit and the target PRI revolutions are substantially equal, and it can be seen that restriction of amount of change on the target PRI revolutions upper limit is loosely set.

The first KD step is completed upon meeting either one of the condition that the actual PRI revolutions reaches the target PRI revolutions (in other words, down-shift to a target down-shift destination is achieved) and KD control completion condition (the condition that the accelerator opening becomes a predetermined value or less in the present example).

[2] The Second KD Step in the Normal KD Control
The second KD step is started in response to completion of [1] the first KD step described above.
The target PRI revolutions upper limit: a value based on an accelerator opening and a vehicle speed is obtained (a map for the second KD step is used). A value according to an accelerator opening and a vehicle speed is obtained as the target PRI revolutions upper limit at each time of predetermined periods.
The target PRI revolutions: the value determined by imposing restriction of amount of change for the second KD step on the target PRI revolutions upper limit. The value is calculated each time the target PRI revolutions upper limit is newly obtained.

When the relationship of the target PRI revolutions upper limit and the target PRI revolutions is compared between "the first KD step (at the time of normal KD)" in the above and "the second KD step (at the time of normal KD)" in FIG. 2, it can be seen that in the second KD step at the time of normal KD control, the difference between the target PRI revolutions upper limit and the target PRI revolutions is large and restriction of amount of change on the target PRI revolutions upper limit is set to be larger.

The second KD step is completed upon meeting either one of the condition that the actual PRI revolutions reaches the target PRI revolutions upper limit and the KD control completion condition.

It is to be noted that the second KD step can be put in other words: the control to increase the actual PRI revolutions with a gradient determined by an accelerator opening and a vehicle speed.

[3] The First KD Step in the Second-Time KD Control
The first KD step is started in response to a second-time KD request.
The target PRI revolutions: the value calculated by adding a down-shift amount (a map is used) determined by an accelerator opening and the number of engine revolutions to the target PRI revolutions (indicated by "X" in FIG. 2) at the time of second-time KD determination (a time at which a second-time KD request is determined to be made). The target PRI revolutions in this case is calculated when a down-shift amount according to an accelerator opening and the number of engine revolutions is obtained at each time of predetermined periods, and the obtained down-shift amount is added to the target PRI revolutions at the time of second-time KD determination.

It is to be noted that the down-shift amount may be determined by using another index value such as the actual PRI revolutions correlated with the number of engine revolutions, instead of the number of engine revolutions.

The first KD step is completed upon meeting either one of the condition that the actual PRI revolutions reaches the target PRI revolutions and the KD control completion condition.

[4] The Second KD Step in the Second-Time KD Control

The same as [2] the second KD step described above except that the second KD step is started in response to completion of [3] the first KD step described above. In other words, the second KD step in the second-time KD control is the control to increase the actual PRI revolutions with a gradient determined by an accelerator opening and a vehicle speed.

It is to be noted that the KD control illustrated above is just an instance, and it is sufficient that the KD control assumed in the present invention change the transmission gear ratio of the automatic transmission to the low side in response to a KD request and increase the number of engine revolutions, and include KD control according to second-time KD.

<3. Lock-Up Control as Implementation>

Here, when the lock-up clutch 24 is in an engaged state, increase of the number of revolutions of the engine 10 for an accelerator operation becomes relatively low. This is because the engine torque is reduced by the inertia on the primary axis 33. Therefore, when the lock-up clutch 24 remains in an engaged state at the time of KD, response to driving force or sound (increase feeling of the number of engine revolutions) for an accelerator operation cannot be sufficiently increased.

Thus, in the present implementation, control to temporarily disengage the lock-up clutch 24 is performed corresponding to the time of KD. That is, both at the time of normal KD and at the time second-time KD, control to temporarily disengage the lock-up clutch 24 is performed according to meeting of a predetermined disengagement condition.

However, a second-time KD request is made when a driver feels that sufficient acceleration is not obtained through the last KD request or when further acceleration is needed for passing or merging with traffic during acceleration by kick-down. When sufficient acceleration feeling is not achieved through the second-time KD request, sense of considerable incongruity may be given to the driver. Thus, in the present implementation, the disengagement condition corresponding to the time of second-time KD is more eased than the disengagement condition for the lock-up clutch 24 corresponding to the time of normal KD, so that the lock-up clutch 24 is more likely to be disengaged at the time of second-time KD.

Specifically, in the present implementation, in response to a normal KD request, it is determined whether or not the following both conditions are met as the disengagement condition: "the accelerator opening rate at the time of normal KD≥a first disengagement opening rate threshold value THa1" and "the difference between the target PRI revolutions at the start of the first KD step ([1] the first KD step described above) and the current actual PRI revolutions≥a first difference threshold value THd1". When the both conditions are met, the lock-up clutch 24 is set to a disengaged state and when the both conditions are not met, the lock-up clutch 24 is not set to a disengaged state.

Here, "the accelerator opening rate at the time of normal KD≥the first disengagement opening rate threshold value THa1" stated above can be put in other words: an index value indicating an operational state of the accelerator at the time of a KD request.

Also, "the difference between the target PRI revolutions at the start of the first KD step and the current actual PRI revolutions" can be put in other words: an index value correlated with the target down-shift amount which is determined according to the accelerator opening at the time of KD (this is because, in the present example, "the target PRI revolutions at the start of the first KD step" is calculated based on an accelerator opening and a vehicle speed as described above).

Not only the condition (accelerator operation condition) related to the accelerator operational state of the former, but also the condition (down-shift amount condition) related to the target down-shift amount of the latter are included in the disengagement condition. This is based on the consideration that in the case where the target down-shift amount is small, even when the lock-up is disengaged, a significant improvement of acceleration feeling is not expected because an increased amount in the number of engine revolutions is small. After all, the lock-up disengagement based on the down-shift amount condition as described above makes it possible to protect against excessive lock-up disengagement based on only the accelerator operational state, and to avoid a decrease in fuel efficiency due to slip of the lock-up clutch 24 and reduction in the life of the lock-up clutch 24.

On the other hand, in response to a second-time KD request, the following both conditions are imposed as the disengagement condition: "the accelerator opening rate at the time of second-time KD≥a second disengagement opening rate threshold value THa2" and "the difference between the target PRI revolutions at the start of the first KD step ([3] the first KD step described above) and the current actual PRI revolutions≥a second difference threshold value THd2". Each of "the second disengagement opening rate threshold value THa2", "the second difference threshold value THd2" used in these conditions is more eased than in the case of the disengagement condition for a normal KD request. Specifically, the disengagement condition is eased by setting that "THa1>THa2", "THd1>THd2".

The disengagement condition for a second-time KD request is eased as described above, in other words, the lock-up is more likely to be disengaged at the time of a second-time KD request, and thus to cope with the case where it is estimated that a driver is likely to feel insufficient acceleration, the lock-up is more likely to be disengaged and it is possible to achieve lock-up control at the time of kick-down, appropriately reflecting the intention of the driver.

Figure 3:
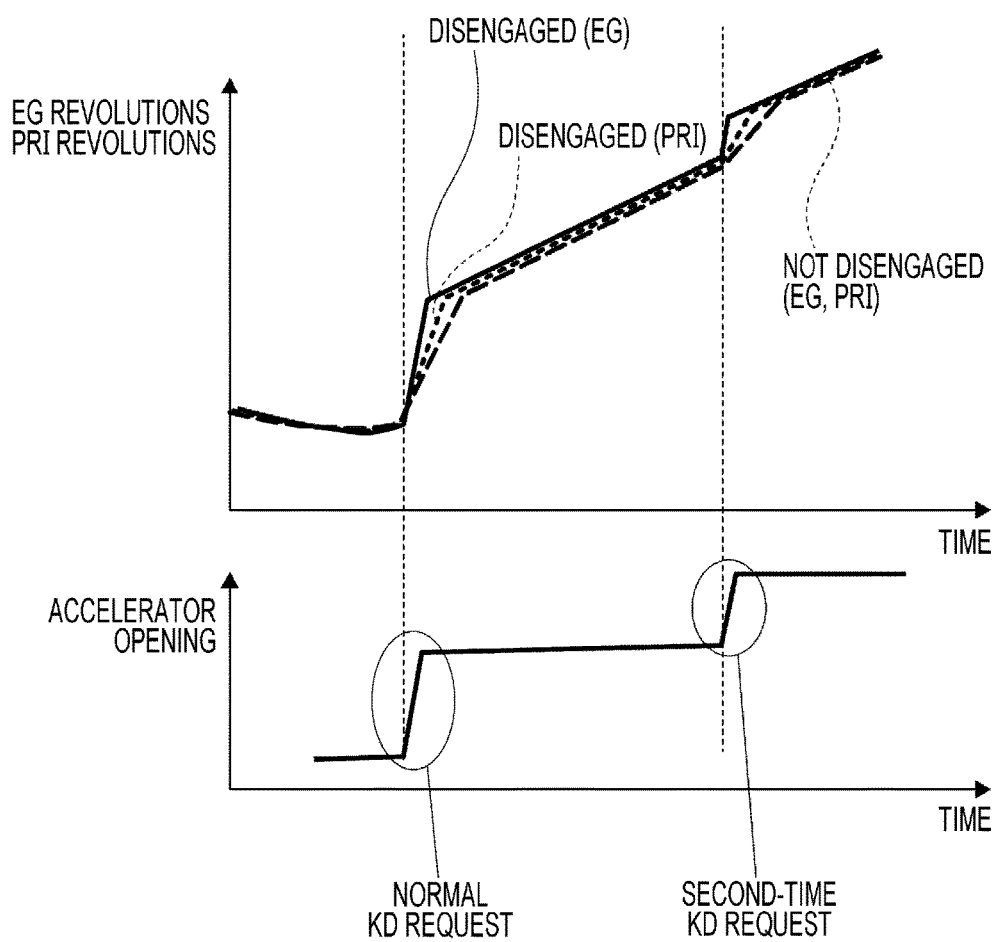
FIG. 3 is an explanatory diagram of the effect of lock-up disengagement in response to a kick-down request.

FIG. 3 is an explanatory diagram of the effect of lock-up disengagement in response to a kick-down request, and change in the number of engine (EG) revolutions for an accelerator operation, similar to the lower graph illustrated in previous FIG. 2, is indicated by a solid line, and the actual PRI revolutions is indicated by a short dashed line. It is to be noted that in FIG. 3, as a comparison, change (change in the actual PRI revolutions illustrated by the upper graph of FIG. 2) in the actual PRI revolutions (=the number of EG revolutions) with the lock-up not disengaged is also indicated by a long dashed line.

It can be seen from the comparison between the solid line and the dashed line that lock-up disengagement in response to a KD request accelerates increase in the number of revolutions of the primary pulley 34 (the number of revolutions of the engine 10). Consequently, improvement in acceleration response and clear KD feeling are achieved.

In the present implementation, in response to a KD request, the speed of lock-up disengagement is accelerated, specifically, in order to achieve improvement in acceleration response and clear KD feeling, control is performed to slightly decompress the lock-up pressure of the lock-up clutch 24 in an engaged state in a preceding stage of a KD request.

Such pressure reduction control in a preceding stage of a KD request is performed according to meeting of the pressure reduction condition for both a normal KD request and a second-time KD request.

Specifically, as the pressure reduction control in a preceding stage of a normal KD request, it is first determined whether or not a pressure reduction condition is met (hereinafter referred to as the "first pre-determination processing), that is, either one of "the accelerator opening≥a first pressure reduction opening threshold value THb1 determined by a vehicle speed and a gradient (a map is used)" and "the accelerator opening rate≥a first pressure reduction opening rate threshold value THe1" is met. The first pre-determination processing is performed during the period from the last completion of KD control until a normal KD request is made. When it is determined that the pressure reduction condition is met by the first pre-determination processing, the lock-up pressure of the lock-up clutch 24 is reduced. The degree of pressure reduction at this point is any degree in a range in which the lock-up clutch 24 is not set to a disengaged state at least. The degree of pressure reduction is determined so that the difference between the number of engine revolutions and the number of turbine revolutions (detected by the turbine rotation sensor 5e) falls within a predetermined value, for instance.

As each of the first pressure reduction opening threshold value THb1, the first pressure reduction opening rate threshold value THe1 as described above used in the first pre-determination processing, a value is used which is relatively smaller than the "predetermined value" for a corresponding one of the accelerator opening and the accelerator opening rate used in the normal KD determination processing described previously. Specifically, a value corresponding to a combination of a vehicle speed and a gradient is set to the first pressure reduction opening threshold value THb1 so that an accelerator opening smaller than the "predetermined value" is greater than or equal to the first pressure reduction opening threshold value THb1 under the condition of the same vehicle speed and gradient. Also, the first pressure reduction opening rate threshold value THe1 is set so that an accelerator opening smaller than the "predetermined value" is greater than or equal to the first pressure reduction opening rate threshold value THe1. This allows the lock-up pressure to be reduced before a normal KD request.

As the pressure reduction control in a preceding stage of a second-time KD request, it is determined whether or not a pressure reduction condition is met (hereinafter referred to as the "second pre-determination processing), that is, either one of "the accelerator opening≥a second pressure reduction opening threshold value THb2 determined by a vehicle speed and a gradient (a map is used)" and "the accelerator opening rate≥a second pressure reduction opening rate threshold value THe2" is met. The second pre-determination processing is performed during the period after a normal KD request is made until the KD control started in response to the normal KD request is completed. When it is determined that the pressure reduction condition is met by the second pre-determination processing, the lock-up pressure of the lock-up clutch 24 is reduced. The degree of pressure reduction in this case is the same as in the case of the pressure reduction control in a preceding stage of a normal KD request. Alternatively, the lock-up pressure in this case may be lower than the lock-up pressure in the case of the pressure reduction control in a preceding stage of a normal KD request (the speed of lock-up disengagement for a second-time KD request is intended to be increased).

As each of the second pressure reduction opening threshold value THb2, the second pressure reduction opening rate threshold value THe2 used in the second pre-determination processing, a value is used which is relatively smaller than the "predetermined value" for a corresponding one of the accelerator opening and the accelerator opening rate used in the second-time KD determination processing, so that the lock-up pressure may be reduced before a second-time KD request. Specifically, a value corresponding to a combination of a vehicle speed and a gradient is set to the second pressure reduction opening threshold value THb2 so that an accelerator opening smaller than the "predetermined value" is greater than or equal to the second pressure reduction opening threshold value THb2 under the condition of the same vehicle speed and gradient. Also, the second pressure reduction opening rate threshold value THe2 is set so that an accelerator opening smaller than the "predetermined value" is greater than or equal to the second pressure reduction opening rate threshold value THe2.

Here, in the pressure reduction control for both normal KD and second-time KD, when the pressure reduction condition is met and the lock-up pressure is reduced, in the case where a normal KD request is not made within a predetermined time from the pressure reduction timing, the lock-up pressure is restored. In other words, the lock-up clutch 24 is returned to a engaged state. This achieves both the improvement in acceleration response due to speed-up of disengagement of the lock-up clutch 24 in response to a KD request and control over the decrease in fuel efficiency due to slip of the lock-up clutch 24 and reduction in the life of the lock-up clutch 24.

In the present example, the start condition of control for the pressure reduction control as described above is more eased at the time of second-time KD that at the time of normal KD. That is, the pressure reduction condition used in the second pre-determination processing corresponding to the time of second-time KD is more eased than the pressure reduction condition used in the first pre-determination processing corresponding to the time of normal KD.

Specifically, the pressure reduction condition corresponding to the time of second-time KD is made more eased by setting "the first pressure reduction opening threshold value THb1>the second pressure reduction opening threshold value THb2" and "the first pressure reduction opening rate threshold value THe1>the second pressure reduction opening rate threshold value THe2".

In the lock-up disengagement control in the present implementation, the lock-up is more likely to be disengaged than at the time of normal KD because the disengagement condition at the time of second-time KD is eased. However, when the pressure reduction condition at the time of second-time KD is set to be equivalent to the pressure reduction condition at the time of normal KD in this situation, the possibility of lock-up disengagement without reduction of the lock-up pressure is increased at the time of second-time KD, and thus reduction in response may be likely to be caused. Thus, as described above, the lock-up pressure is more likely to be reduced at the time of second-time KD, thereby protecting against lock-up disengagement without reduction of the lock-up pressure at the time of second-time KD. Thus, it is possible to protect against reduction in response at the time of second-time KD.

<4. Processing Step>

The specific processing steps to be performed to achieve the lock-up control as the implementation will be described with reference to the flow charts of FIG. 4 and FIG. 5.

Figure 4:
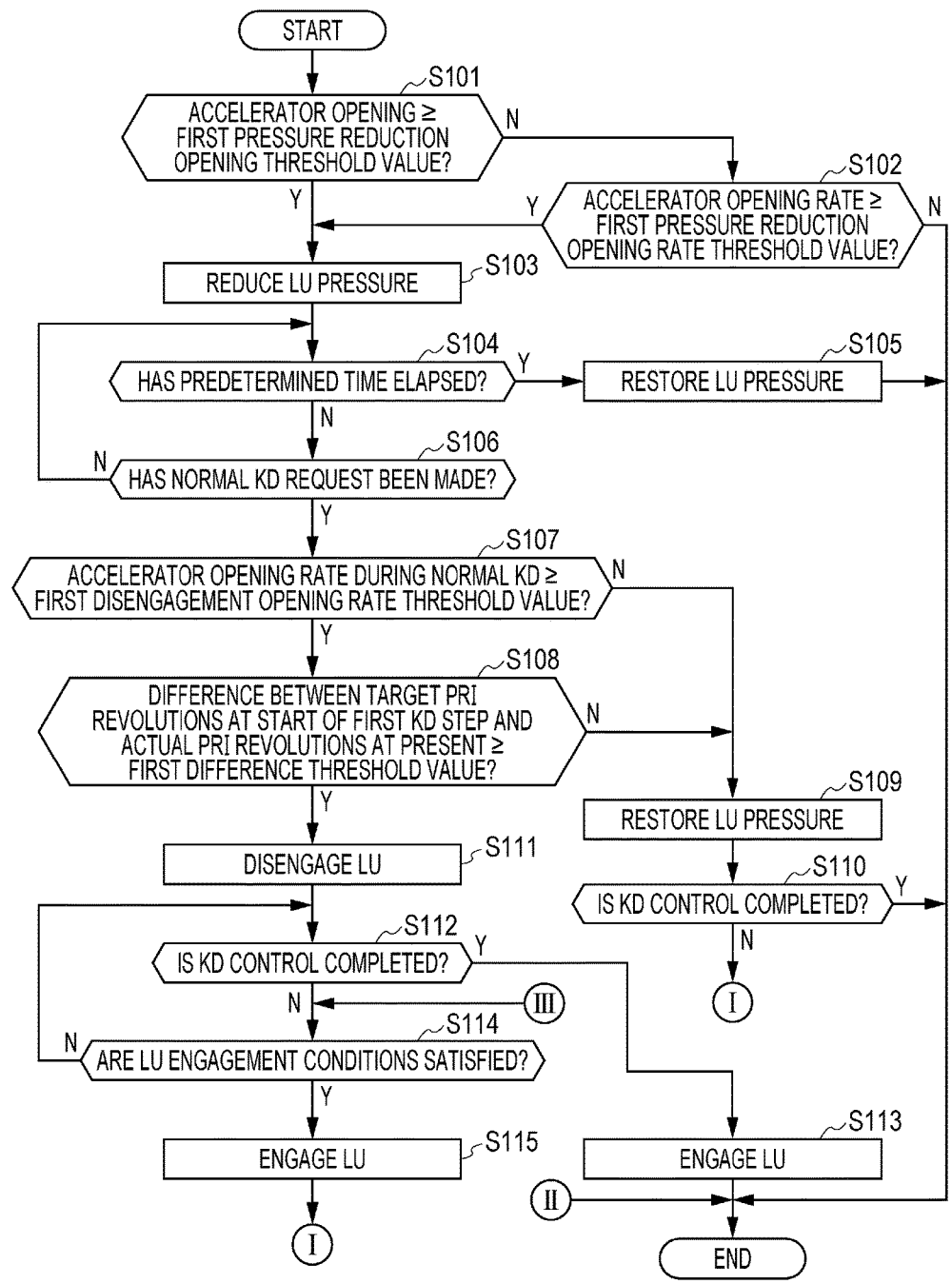
FIG. 4 is a flow chart illustrating the processing steps to be performed to achieve lock-up control as an implementation.
Figure 5:
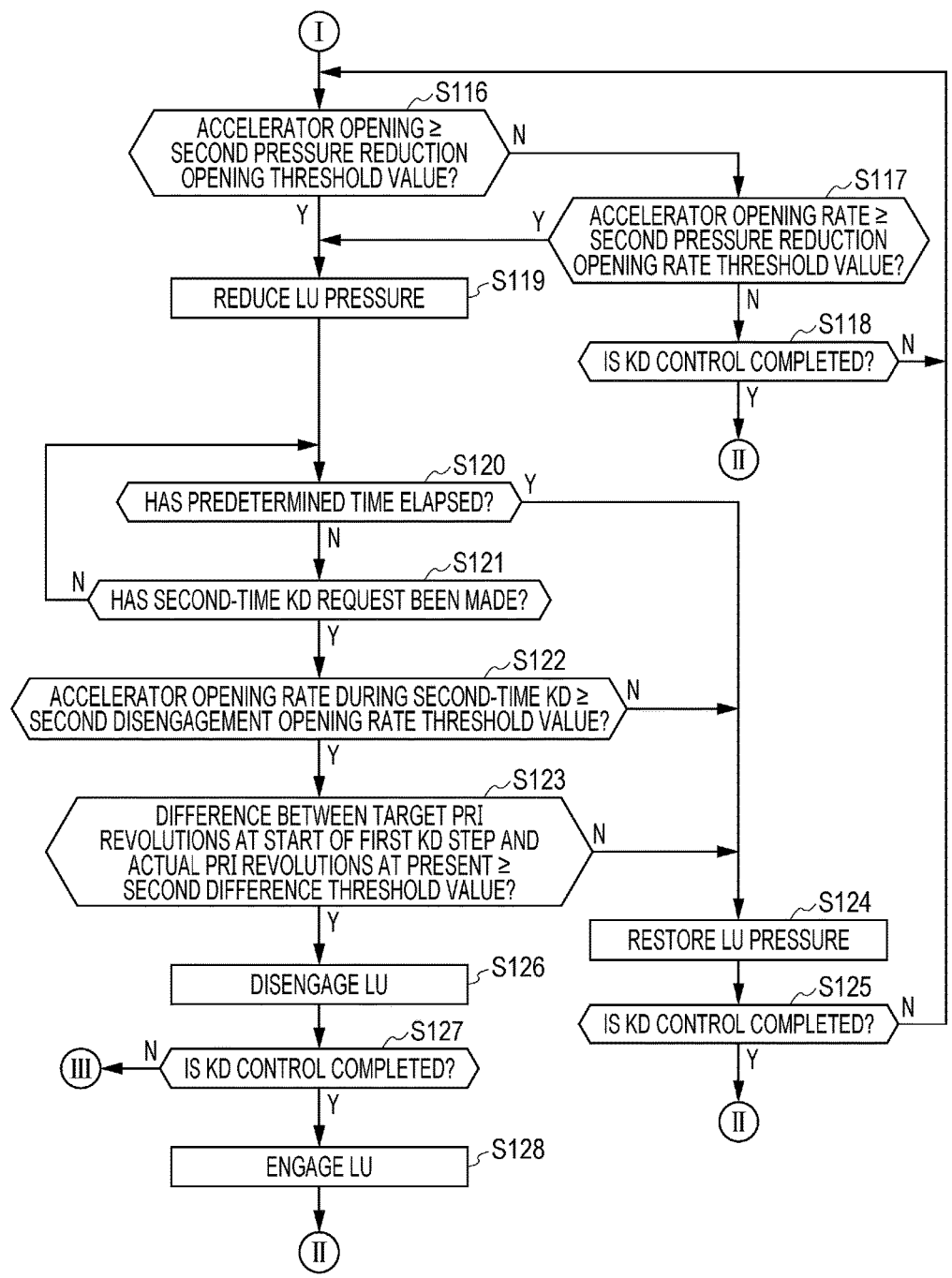
FIG. 5 is also a flow chart illustrating the processing steps to be performed to achieve lock-up control as an implementation.

It is to be noted that the processing illustrated in FIG. 4 and FIG. 5 is performed by the transmission controller 3 (CPU) illustrated in FIG. 1 in accordance with a program stored in a predetermined storage device, for instance, a built-in ROM. The transmission controller 3 performs the processing illustrated in FIG. 4 and FIG. 5 repeatedly with a predetermined period.

In FIG. 4, the transmission controller 3 determines in step S101 whether or not "the accelerator opening≥the first pressure reduction opening threshold value THb1". As described above, the first pressure reduction opening threshold value THb1 is a value determined by a vehicle speed and a gradient, and the first pressure reduction opening threshold value THb1 is obtained using a map in the present example. When "the accelerator opening≥the first pressure reduction opening threshold value THb1" is not the case, the flow proceeds to step S102, and it is determined whether or not "the accelerator opening rate≥the first pressure reduction opening rate threshold value THe1". The determination processing in these steps S101 and S102 corresponds to the processing of determining (the first pre-determination processing) whether or not the pressure reduction condition is met for the above-described pressure reduction control in a preceding stage of a normal KD request.

In step S102, when "the accelerator opening rate≥the first pressure reduction opening rate threshold value THe1" is not the case, the transmission controller 3 completes the processing illustrated in FIG. 4 and FIG. 5. In short, when the pressure reduction condition is not met, the lock-up pressure is not reduced.

When it is determined in step S101 that "the accelerator opening≥the first pressure reduction opening threshold value THb1" or it is determined in step S102 that "the accelerator opening rate≥the first pressure reduction opening rate threshold value THe1", the flow proceeds to step S103 and the transmission controller 3 performs the processing for reducing the lock-up pressure. Specifically, the lock-up pressure of the lock-up clutch 24 in an engaged state is reduced by the control valve 38.

In the subsequent step S104, the transmission controller 3 determines whether or not a predetermined time has elapsed since the pressure reduction processing for the lock-up pressure is performed. When a predetermined time has elapsed, the flow proceeds to step S105, and as lock-up pressure restore processing, the transmission controller 3 performs processing to restore the lock-up pressure of the lock-up clutch 24 to the pressure in an engaged state by the control valve 38, the completes the processing illustrated in FIG. 4 and FIG. 5.

On the other hand, when a predetermined time has not elapsed in step S104, the flow proceeds to step S106 and the transmission controller 3 determines whether or not a normal KD request has been made (the normal KD determination processing described above), and when a normal KD request has not been made, the flow returns to step S104. That is, loop processing is formed by the processing in steps S104 and S106, the loop processing waiting for either one of elapse of a predetermined time since reduction of the lock-up pressure and a normal KD request.

When it is determined that a normal KD request has been made, the flow of the transmission controller 3 proceeds to step S107. It is determined by the processing in steps S107 and S108 whether or not the disengagement condition corresponding to the time of a normal KD request is met. Specifically, the transmission controller 3 determines in step S107 whether or not "the accelerator opening rate at the time of normal KD≥the first disengagement opening rate threshold value THa1". When "the accelerator opening rate at the time of normal KD≥the first disengagement opening rate threshold value THa1" is not the case, the flow proceeds to step S109 and the transmission controller 3 performs lock-up pressure restore processing. In other words, even when a normal KD request is made, if the disengagement condition is not met and the lock-up is not disengaged, the lock-up clutch 24 is returned to an engaged state.

On the other hand, when "the accelerator opening rate at the time of normal KD≥the first disengagement opening rate threshold value THa1" in step S107, the transmission controller 3 determines in step S108 whether or not "the difference between the target PRI revolutions at the start of the first KD step and the current actual PRI revolutions≥the first difference threshold value THd1". It is to be noted that as understood from the previous description, "the first KD step" here indicates

[1] the first KD step described above. When "the difference between the target PRI revolutions at the start of the first KD step and the current actual PRI revolutions≥the first difference threshold value THd1" is not the case, the disengagement condition is not met, and thus the flow proceeds to step S109 and the transmission controller 3 performs the lock-up pressure restore processing.

On the other hand, when "the difference between the target PRI revolutions at the start of the first KD step and the current actual PRI revolutions≥the first difference threshold value THd1", in other words, when both conditions in steps S107 and S108 are met, the flow proceeds to step S111 and as the lock-up disengagement processing, the transmission controller 3 performs processing to set the lock-up clutch 24 to a disengaged state by the control valve 38.

In response to execution of the lock-up disengagement processing in step S111, the transmission controller 3 determines in step S112 whether or not the KD control is completed. Are described above, in the present example, the completion condition for the KD control is that the accelerator opening is a predetermined value or less.

When the KD control is completed, the flow proceeds to step S113 and as the lock-up engagement processing, the transmission controller 3 performs processing to set the lock-up clutch 24 to an engaged state by the control valve 38, then completes the processing illustrated in FIG. 4 and FIG. 5.

On the other hand, when the KD control is not completed, the flow proceeds to step S114 and the transmission controller 3 determines whether or not a lock-up engagement condition is met. The lock-up engagement condition is a predetermined condition as the start condition for the control to change the lock-up clutch 24 from a disengaged state to an engaged state during the KD control. When the lock-up engagement condition is not met, the flow returns to step S112 and the transmission controller 3 determines again whether or not the KD control is completed. That is, loop processing is formed by the processing in steps S112 and S114, the loop processing waiting for either one of completion of the KD control after the lock-up disengagement and meeting of the lock-up engagement condition.

When it is determined in step S114 that the lock-up engagement condition is met, the flow proceeds to step S115 and the transmission controller 3 performs the lock-up engagement processing and the flow proceeds to the processing in step S116 illustrated in FIG. 5. The processing illustrated in FIG. 5 is processing corresponding to the second-time KD.

When the lock-up pressure restore processing is performed in the previous step S109, that is, when the lock-up pressure is reduced by the first pre-determination processing, then a normal KD request is made and the KD control is started, but the lock-up clutch 24 is returned from a decompressed state to an engaged state without disengaging the lock-up because the disengagement condition is not met, the transmission controller 3 determines in step S110 whether or not the KD control is completed. When the KD control is completed, the transmission controller 3 completes the processing illustrated in FIG. 4 and FIG. 5, whereas when the KD control is not completed, the flow proceeds to the processing in step S116 illustrated in FIG. 5. As understood from this point, in the present example, even when a normal KD request is made, if the disengagement condition is not met, the lock-up is not disengaged. Even in the case where the lock-up is not disengaged like this, the processing corresponding to the second-time KD illustrated in FIG. 5, that is, the above-described pressure reduction of the lock-up clutch 24 corresponding to the time of second-time KD and the subsequently disengagement control may be performed.

In FIG. 5, the determination processing in steps S116 and S117 corresponds to the processing of determining (the second pre-determination processing) whether or not the pressure reduction condition is met for the above-described pressure reduction control in a preceding stage of a second-time KD request. Specifically, the transmission controller 3 determines in step S116 whether or not "the accelerator opening≥the second pressure reduction opening threshold value THb2". Similarly to the first pressure reduction opening threshold value THb1, the second pressure reduction opening threshold value THb2 is a value determined by a vehicle speed and a gradient, and in the present example, the threshold value THb2 is obtained using a map.

When "the accelerator opening≥the second pressure reduction opening threshold value THb2" is not the case, the flow proceeds to step S117 and the transmission controller 3 determines whether or not "the accelerator opening rate≥the second pressure reduction opening rate threshold value THe2". When "the accelerator opening rate≥the second pressure reduction opening rate threshold value THe2" is not the case, the transmission controller 3 determines in step S118 whether or not the KD control is completed. When the KD control is not completed, the flow returns to step S116 (in short, it is determined again whether or not the pressure reduction condition is met), and when the KD control is completed, the processing illustrated in FIG. 4 and FIG. 5 is completed.

When it is determined in step S116 that "the accelerator opening≥the second pressure reduction opening threshold value THb2" or it is determined in step S117 that "the accelerator opening rate≥the second pressure reduction opening rate threshold value THe2", the flow proceeds to step S119 and the transmission controller 3 performs processing for reducing the lock-up pressure. Thus, pressure reduction of the lock-up clutch 24 in a preceding stage of a second-time KD request is achieved according to meeting of the pressure reduction condition.

In the subsequent step S120, the transmission controller 3 determines whether or not a predetermined time has elapsed since the pressure reduction processing for the lock-up pressure is performed. When a predetermined time has elapsed, the flow proceeds to step S124 and the lock-up pressure restore processing is performed, then it is determined in step S125 whether or not the KD control is completed. When the KD control is not completed, the flow returns to step S116 (in short, the second pre-determination processing is performed again), and when the KD control is completed, the processing illustrated in FIG. 4 and FIG. 5 is completed.

On the other hand, when a predetermined time has not elapsed, the transmission controller 3 determines in step S121 whether or not a second-time KD request has been made (the second-time KD determination processing described above), and when a second-time KD request has not been made, the flow returns to step S120. That is, the processing in steps S120 and S121 creates waiting for either one of elapse of a predetermined time since reduction of the lock-up pressure and a second-time KD request.

When it is determined that a second-time KD request has been made, the transmission controller 3 performs processing for determining whether or not a disengagement condition is met in step S122 and step S123, the disengagement condition corresponding to the time of a second-time KD request. That is, the transmission controller 3 determines in step S123 whether or not "the accelerator opening rate at the time of second-time KD≥the second disengagement opening rate threshold value THa2", and when "the accelerator opening rate at the time of second-time KD≥the second disengagement opening rate threshold value THa2" is not the case, since the disengagement condition is not met, the flow proceeds to step S124 and the transmission controller 3 performs the lock-up pressure restore processing. In other words, even when a second-time KD request is made, if the disengagement condition is not met and the lock-up is not disengaged, the lock-up clutch 24 is returned to an engaged state. Subsequently, the second pre-determination processing is performed again or the processing illustrated in FIG. 4 and FIG. 5 is completed as the KD control is completed.

On the other hand, when "the accelerator opening rate at the time of second-time KD≥the second disengagement opening rate threshold value THa2" in step S122, the transmission controller 3 determines in step S123 whether or not "the difference between the target PRI revolutions at the start of the first KD step and the current actual PRI revolutions≥the second difference threshold value THd2". As understood from the previous description, "the first KD step" here indicates

[3] the first KD step described above. When "the difference between the target PRI revolutions at the start of the first KD step and the current actual PRI revolutions≥the second difference threshold value THd2" is not the case, since the disengagement condition is not met, the flow proceeds to step S124 and the transmission controller 3 performs the lock-up pressure restore processing (the lock-up is not disengaged).

When it is determined in step S123 that "the difference between the target PRI revolutions at the start of the first KD step and the current actual PRI revolutions≥the second difference threshold value THd2", in other words, when both conditions in steps S122 and S123 are met, the flow proceeds to step S126 and the transmission controller 3 performs the lock-up disengagement processing.

In response to execution of the lock-up disengagement processing in step S126, the transmission controller 3 determines in step S127 whether or not the KD control is completed. When the KD control is not completed, the flow proceeds to step S114 and the transmission controller 3 determines whether or not the lock-up engagement condition is met. Thus, after the lock-up is disengaged correspondingly to second-time KD, the lock-up engagement processing is performed according to meeting of the lock-up engagement condition, and subsequently, processing corresponding to second-time KD (the second pre-determination processing and determination of meeting of the lock-up disengagement condition) may be performed again.

On the other hand, when the KD control is completed in step S127, the flow proceeds to step S128 and the transmission controller 3 performs the lock-up engagement processing, then the processing illustrated in FIG. 4 and FIG. 5 is completed.

In the above, for disengagement condition and pressure reduction condition corresponding to normal KD/second-time KD, an instance has been given in which the condition is eased by using different threshold values for determination with the same determination items. However, ease of disengagement condition or pressure reduction condition may be achieved by reducing the number of imposed conditions, specifically, reducing the number of items for determining whether or not each condition is met.

Also, the degree of ease of the disengagement condition may be made variable according to the gradient of a road on which the vehicle runs. In this case, the transmission controller 3 sets a variable degree of ease of the disengagement condition used for a second-time KD request with respect to the disengagement condition used for a normal KD request according to a gradient detected by the gradient sensor 5f.

Consequently, the lock-up clutch 24 may be made likely to be disengaged with a higher upward gradient, and the lock-up disengagement corresponding to the time of a second-time KD request may be appropriately made according to a gradient.

<5. Summary of Implementation>

As described above, the vehicle control apparatus (the transmission controller 3) in the implementation is a vehicle control apparatus including an automatic transmission having a torque converter provided with a lock-up clutch, the vehicle control apparatus including a kick-down controller that performs kick-down control to change a transmission gear ratio to a low side and to increase a number of engine revolutions based on a kick-down request in accordance with an accelerator operation.

Also, the vehicle control apparatus includes a lock-up controller that performs lock-up disengagement control based on the kick-down request to set the lock-up clutch to a disengaged state according to meeting of a disengagement condition.

In addition, when the kick-down request while the kick-down control is not in operation is referred to as a normal kick-down request and the kick-down request while the kick-down control is in operation is referred to as a second-time kick-down request, the lock-up controller performs lock-up disengagement control according to the second-time kick-down request based on the disengagement condition which is more eased than the disengagement condition used for the normal kick-down request.

Thus, the lock-up is more likely to be disengaged at the time of a second-time kick-down request. In other words, to cope with the case where it is estimated that a driver is likely to feel insufficient acceleration, the lock-up is more likely to be disengaged.

Therefore, it is possible to achieve lock-up control appropriately reflecting the intention of a driver at the time of kick-down and to reduce sense of incongruity of the driver.

Also, in the vehicle control apparatus in the implementation, the lock-up controller performs the lock-up disengagement control according to the normal and second-time kick-down requests based on the disengagement condition including an accelerator operation condition and a down-shift amount condition, the accelerator operation condition being defined as a magnitude relationship between a first threshold value (THa1 or THa2) and an index value (the accelerator opening rate in the example) indicating an operational state of an accelerator at a time of kick-down request, the down-shift amount condition being defined as a magnitude relationship between a second threshold value (THd1 or THd2) and an index value (the difference between the target PRI revolutions at the start of the first KD step and the current actual PRI revolutions) correlated with a target down-shift amount which is determined according to an accelerator opening at the time of kick-down request.

In the case where the target down-shift amount is small, even when the lock-up is disengaged, a significant improvement of acceleration feeling is not expected because an increased amount in the number of engine revolutions is small. Thus, the lock-up disengagement based on the down-shift amount condition as described above makes it possible to protect against excessive lock-up disengagement based on only the accelerator operational state, and to avoid a decrease in fuel efficiency due to slip of the lock-up clutch and reduction in the life of the lock-up clutch.

Furthermore, in the vehicle control apparatus in the implementation, the lock-up controller eases the disengagement condition by changing values for the normal kick-down request and the second-time kick-down request, the values being used as the first threshold value and the second threshold value.

Consequently, the types and number of determination items for determining whether or not the disengagement condition is met do not have to be changed for each of normal/second-time kick-down time, and thus it is possible to avoid increased complexity of the processing related to the lock-up control.

Moreover, the vehicle control device in the implementation further includes a gradient detector (gradient sensor 5f) that detects a gradient of a road on which the vehicle runs, and according to the gradient, the lock-up controller sets a variable degree of ease of the disengagement condition used for the second-time kick-down request with respect to the disengagement condition used for the normal kick-down request.

Consequently, the lock-up clutch may be made likely to be disengaged with a higher upward gradient, and the lock-up disengagement corresponding to the time of a second-time kick-down request may be appropriately made according to a gradient.

Also, in the vehicle control apparatus in the implementation, the lock-up controller performs pressure reduction control to reduce a lock-up pressure of the lock-up clutch according to meeting of a pressure reduction condition in each of a preceding stage of the normal kick-down request and a preceding stage of the second-time kick-down request.

Thus, for both the normal kick-down and second-time kick-down, the time period from meeting of the disengagement condition until the lock-up is disengaged may be shortened, and it is possible to achieve improvement in response to an accelerator operation of a driver.

Furthermore, in the vehicle control apparatus in the implementation, the lock-up controller performs the pressure reduction control in the preceding stage of the second-time kick-down request based on the pressure reduction condition which is more eased than the pressure reduction condition used for the pressure reduction control in the preceding stage of the normal kick-down request.

Thus, the lock-up pressure is more likely to be reduced at the time of second-time kick-down, thereby protecting against lock-up disengagement without reduction of the lock-up pressure at the time of second-time kick-down. Therefore, it is possible to protect against reduction in response at the time of second-time kick-down.

The invention claimed is:

1. A vehicle control apparatus for a vehicle including an automatic transmission including a torque converter provided with a lock-up clutch, the vehicle control apparatus comprising:
   a kick-down controller that performs a kick-down control to change a transmission gear ratio to a low side and to increase a number of engine revolutions based on a kick-down request in accordance with an accelerator operation; and
   a lock-up controller that performs a lock-up disengagement control based on the kick-down request to set the lock-up clutch to a disengaged state according to meeting of a disengagement condition,
   wherein, when the kick-down request while the kick-down control is not in operation is referred to as a normal kick-down request and the kick-down request while the kick-down control is in operation to increase the number of engine revolutions is referred to as a second-time kick-down request, the lock-up controller performs lock-up disengagement control according to the second-time kick-down request based on the disengagement condition which is more eased than the disengagement condition used for the normal kick-down request.

2. The vehicle control apparatus according to claim 1, wherein the lock-up controller performs the lock-up disengagement control according to the normal and second-time kick-down requests based on the disengagement condition comprising an accelerator operation condition and a down-shift amount condition, the accelerator operation condition being defined as a magnitude relationship between a first threshold value and an index value indicating an operational state of an accelerator at a time of kick-down request, the down-shift amount condition being defined as a magnitude relationship between a second threshold value and an index value correlated with a target down-shift amount which is determined according to an accelerator opening at the time of kick-down request.

3. The vehicle control apparatus according to claim 2, wherein the lock-up controller eases the disengagement condition by changing values for the normal kick-down request and the second-time kick-down request, the values being used as the first threshold value and the second threshold value.

4. The vehicle control apparatus according to claim 3, further comprising:
   a gradient detector that detects a gradient of a road on which the vehicle runs,
   wherein, according to the gradient, the lock-up controller sets a degree of ease of the disengagement condition used for the second-time kick-down request with respect to the disengagement condition used for the normal kick-down request.

5. The vehicle control apparatus according to claim 4, wherein the lock-up controller performs a pressure reduction control to reduce a lock-up pressure of the lock-up clutch according to meeting of a pressure reduction condition in each of a stage performed prior to the normal kick-down request and a stage performed prior to the second-time kick-down request.

6. The vehicle control apparatus according to claim 5, wherein the lock-up controller performs the pressure reduction control in the stage performed prior to the second-time kick-down request based on the pressure reduction condition which is more eased than the pressure reduction condition used for the pressure reduction control in the stage performed prior to the normal kick-down request.

7. The vehicle control apparatus according to claim 3, wherein the lock-up controller performs a pressure reduction control to reduce a lock-up pressure of the lock-up clutch according to meeting of a pressure reduction condition in each of a stage performed prior to the normal kick-down request and a stage performed prior to the second-time kick-down request.

8. The vehicle control apparatus according to claim 7, wherein the lock-up controller performs the pressure reduction control in the stage performed prior to the second-time kick-down request based on the pressure reduction condition which is more eased than the pressure reduction condition used for the pressure reduction control in the stage performed prior to the normal kick-down request.

9. The vehicle control apparatus according to claim 2, further comprising:
   a gradient detector that detects a gradient of a road on which the vehicle runs,
   wherein, according to the gradient, the lock-up controller sets a degree of ease of the disengagement condition used for the second-time kick-down request with respect to the disengagement condition used for the normal kick-down request.

10. The vehicle control apparatus according to claim 9, wherein the lock-up controller performs a pressure reduction control to reduce a lock-up pressure of the lock-up clutch according to meeting of a pressure reduction condition in each of a stage performed prior to the normal kick-down request and a stage performed prior to the second-time kick-down request.

11. The vehicle control apparatus according to claim 10, wherein the lock-up controller performs the pressure reduction control in the stage performed prior to the second-time kick-down request based on the pressure reduction condition which is more eased than the pressure reduction condition used for the pressure reduction control in the stage performed prior to the normal kick-down request.

12. The vehicle control apparatus according to claim 2, wherein the lock-up controller performs a pressure reduction control to reduce a lock-up pressure of the lock-up clutch according to meeting of a pressure reduction condition in each of a stage performed prior to the normal kick-down request and a stage performed prior to the second-time kick-down request.

13. The vehicle control apparatus according to claim 12, wherein the lock-up controller performs the pressure reduction control in the stage performed prior to the second-time kick-down request based on the pressure reduction condition which is more eased than the pressure reduction condition used for the pressure reduction control in the stage performed prior to the normal kick-down request.

14. The vehicle control apparatus according to claim 1, further comprising:
a gradient detector that detects a gradient of a road on which the vehicle runs,
wherein, according to the gradient, the lock-up controller sets a degree of ease of the disengagement condition used for the second-time kick-down request with respect to the disengagement condition used for the normal kick-down request.

15. The vehicle control apparatus according to claim 14, wherein the lock-up controller performs a pressure reduction control to reduce a lock-up pressure of the lock-up clutch according to meeting of a pressure reduction condition in each of a stage performed prior to the normal kick-down request and a stage performed prior to the second-time kick-down request.

16. The vehicle control apparatus according to claim 15, wherein the lock-up controller performs the pressure reduction control in the stage performed prior to the second-time kick-down request based on the pressure reduction condition which is more eased than the pressure reduction condition used for the pressure reduction control in the stage performed prior to the normal kick-down request.

17. The vehicle control apparatus according to claim 1, wherein the lock-up controller performs a pressure reduction control to reduce a lock-up pressure of the lock-up clutch according to meeting of a pressure reduction condition in each of a stage performed prior to the normal kick-down request and a stage performed prior to the second-time kick-down request.

18. The vehicle control apparatus according to claim 17, wherein the lock-up controller performs the pressure reduction control in the stage performed prior to the second-time kick-down request based on the pressure reduction condition which is more eased than the pressure reduction condition used for the pressure reduction control in the stage performed prior to the normal kick-down request.

19. The vehicle control apparatus according to claim 1, wherein, during the second-time kick-down request, the number of engine revolutions is continuously increased.

20. The vehicle control apparatus according to claim 1, wherein the lock-up clutch is more disengaged during the second-time kick-down request than during the normal kick-down request.

* * * * *